US012794952B2

(12) United States Patent
Foti et al.

(10) Patent No.: US 12,794,952 B2
(45) Date of Patent: Nov. 10, 2026

(54) INTERNET PROTOCOL MULTIMEDIA SUBSYSTEM SESSION SUPPORT FOR NETWORK DATA ANALYTICS FUNCTION

(71) Applicant: Telefonaktiebolaget LM Ericsson (publ), Stockholm (SE)

(72) Inventors: George Foti, Dollard des Ormeaux (CA); Mats Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/694,201

(22) PCT Filed: Sep. 27, 2022

(86) PCT No.: PCT/IB2022/059200
§ 371 (c)(1),
(2) Date: Mar. 21, 2024

(87) PCT Pub. No.: WO2023/047388
PCT Pub. Date: Mar. 30, 2023

(65) Prior Publication Data

US 2025/0141937 A1 May 1, 2025

Related U.S. Application Data

(60) Provisional application No. 63/248,669, filed on Sep. 27, 2021.

(51) Int. Cl.
*H04L 65/1016* (2022.01)
*H04L 41/40* (2022.01)
*H04L 65/1073* (2022.01)

(52) U.S. Cl.
CPC .......... *H04L 65/1016* (2013.01); *H04L 41/40* (2022.05); *H04L 65/1073* (2013.01)

(58) Field of Classification Search
CPC .. H04L 65/1016; H04L 41/40; H04L 65/1073
(Continued)

(56) References Cited

U.S. PATENT DOCUMENTS 11,038,776 B2 * 6/2021 Lee ......................... H04L 43/55
2008/0240117 A1 * 10/2008 Gavita .................... H04L 51/48
370/400

(Continued)

FOREIGN PATENT DOCUMENTS

WO 2019/197467 A1 10/2019

OTHER PUBLICATIONS

I. Herwono, J. Sachs and R. Keller, "Integration of Media Point System with the 3GPP IMS," 11th European Wireless Conference 2005—Next Generation wireless and Mobile Communications and Services, Nicosia, Cyprus, 2006, pp. 1-7. (Year: 2005).*

(Continued)

*Primary Examiner* — Taylor A Elfervig
(74) *Attorney, Agent, or Firm* — Sonoda & Kobayashi Intellectual Property Law; Darren M. Gardner

(57) ABSTRACT

A first network function in a network node is described. The network node comprises a communication interface and processing circuitry. The communication interface is configured to transmit a registration to a registry function to register an associated service profile indicating a network node capability to expose at least one of Internet Protocol, IP, Multimedia Subsystem, IMS, events and IMS analytics data on behalf of one or more IMS nodes; receive a request to subscribe to and be notified of the at least one of the IMS events and the IMS analytics data; notify of the at least one of the IMS events and the IMS analytics data based at least in part on the received request. Information related to the at least one of the IMS events and the IMS analytics data is (Continued)

obtained, by the processing circuitry, from the corresponding IMS nodes in the IMS network.

23 Claims, 7 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 2023/0224752 | A1 * | 7/2023 | Huang .................... | H04L 47/83 370/252 |
| 2024/0137392 | A1 * | 4/2024 | Keller ................. | H04L 65/1016 |
| 2024/0314027 | A1 * | 9/2024 | Fu ....................... | H04L 41/0806 |

OTHER PUBLICATIONS

A. Sánchez-Esguevillas, B. Carro, G. Camarillo, Y. -B. Lin, M. A. García-Martín and L. Hanzo, "IMS: The New Generation of Internet-Protocol-Based Multimedia Services," in Proceedings of the IEEE, vol. 101, No. 8, pp. 1860-1881, Aug. 2013 (Year: 2013).*

P. Reichl et al., "Practical Experiences with an IMS-Aware Location Service Enabler on Top of an Experimental Open Source IMS Core Implementation," in Journal of Mobile Multimedia, vol. 2, No. 3, pp. 189-224, Jul. 2006 (Year: 2006).*

Gomez et al., "Security policies definition and enforcement utilizing policy control function framework in 5G", Computer Communications, vol. 172, 2021, pp. 226-237, Science Direct (Year: 2021).*

International Search Report and Written Opinion dated Nov. 8, 2022 issued in PCT Application No. PCT/IB2022/059200 filed Sep. 27, 2022, consisting of 17 pages.

3GPP TS 23.288 V16.3.0 (Mar. 2020) 3rd Generation Partnership Project; Technical Specification Group Services and System Aspects; Architecture enhancements for 5G System (5GS) to support network data analytics services (Release 16), consisting of 62 pages.

SA WG2 Temporary Document; S2-2001210 (merge of S2-2000854, 2000167); Source: Huawei, HiSilicon, Ericsson?; Title: Solution to multiple NWDAF instances; Document for: Approval; Agenda Item: 8.2; Work Item / Release: FS_eNA_Ph2; Jan. 13-17, 2020, Incheon, Korea, consisting of 8 pages.

3GPP TR 23.700-40 V0.4.0 (Jun. 2020) 3rd Generation Partnership Project; Technical Specification Group Services and System Aspects; Study on enhancement of network slicing; Phase 2 (Release 17), consisting of 143 pages.

3GPP TS 23.228 V17.1.0 (Jun. 2021) 3rd Generation Partnership Project; Technical Specification Group Services and System Aspects; IP Multimedia Subsystem (IMS); Stage 2 (Release 17), consisting of 353 pages.

3GPP TS 23.288 V17.1.0 (Jun. 2021) 3rd Generation Partnership Project; Technical Specification Group Services and System Aspects; Architecture enhancements for 5G System (5GS) to support network data analytics services (Release 17), consisting of 192 pages.

3GPP TS 23.501 V17.1.1 (Jun. 2021) 3rd Generation Partnership Project; Technical Specification Group Services and System Aspects; System architecture for the 5G System (5GS); Stage 2 (Release 17), consisting of 526 pages.

3GPP TS 23.502 V17.1.0 (Jun. 2021) 3rd Generation Partnership Project; Technical Specification Group Services and System Aspects; Procedures for the 5G System (5GS); Stage 2 (Release 17), consisting of 692 pages.

* cited by examiner

INTERNET PROTOCOL MULTIMEDIA SUBSYSTEM SESSION SUPPORT FOR NETWORK DATA ANALYTICS FUNCTION

CROSS-REFERENCE TO RELATED APPLICATIONS

This application is a Submission Under 35 U.S.C. § 371 for U.S. National Stage Patent Application of International Application No.: PCT/IB2022/059200, filed Sep. 27, 2022 entitled "INTERNET PROTOCOL MULTIMEDIA SUBSYSTEM SESSION SUPPORT FOR NETWORK DATA ANALYTICS FUNCTION," which claims priority to U.S. Provisional Application No.: 63/248,669, filed Sep. 27, 2021, entitled "INTERNET PROTOCOL (IP) MULTIMEDIA SUBSYSTEM SESSION (IMS) SUPPORT FOR NETWORK DATA ANALYTICS FUNCTION (NWDAF)" the entireties of both of which are incorporated herein by reference.

TECHNICAL FIELD

The present disclosure relates to wireless communication and in particular, methods and apparatuses for Internet Protocol (IP) Multimedia Subsystem (IMS) support for network data analytics function (NWDAF).

BACKGROUND

The Third Generation Partnership Project (3GPP) has developed and is developing standards for Fourth Generation (4G) (also referred to as Long Term Evolution (LTE)), Fifth Generation (5G) (also referred to as New Radio (NR)), and Sixth Generation (6G) wireless communication systems. Such systems provide, among other features, broadband communication between network nodes (NNs), such as base stations, and mobile wireless devices (WD) such as user equipment (UE), as well as communication between network nodes and between WDs.

NWDAF is a network function (NF) associated with 3GPP 5th Generation Core (5GC) that allows operators and third parties to collect a variety of analytics reports related to 5GC NFs. These reports can be used for variety of purposes. Further, Internet Protocol (IP) Multimedia Subsystem (IMS) enables operators of a Public Land Mobile Network (PLMN) to provide their subscribers with multimedia services based and built on internet applications, services and protocols. Different services and applications can be offered on top of IMS. In addition, IMS as a service network may provide a variety of information that may also be exposed to one or more entities, e.g., operators and third parties through mostly proprietary tools.

However, the existing data collection process, e.g., associated with IMS and/or NWDAF, is not integrated in (e.g., provided by) one collection point. Instead, existing data collection is performed by multiple collection points. Performing data collection at multiple collection points leads to unavailability of data such as when one or more collection points is not available in the network.

SUMMARY

Some embodiments advantageously provide methods and apparatuses for IMS support for NWDAF.

In one embodiment, a network function implemented in a network node configured to, and/or comprising a communication interface and/or comprising processing circuitry configured to: transmit a registration to a registry function to register an associated service profile, indicating the network node capability to expose Internet Protocol (IP) Multimedia Subsystem (IMS) events/analytics data on behalf of IMS nodes of an IMS network; receive, from a second network function (NF), a request to subscribe to and be notified of one or more of the IMS events/analytics data; obtain information related to the IMS events/analytics data from the corresponding IMS nodes in the IMS network; and notify the second network function of the IMS event/analytics data based on the received subscription.

In one embodiment, a network node is configured to receive, from a consumer network function, NF, associated with a network, a request for an Internet Protocol (IP) Multimedia Subsystem (IMS) information; as a result of the request for IMS information, identify a provider NF associated with an IMS interworking function (IWF); and send a response to the consumer NF based on the identification of the provider NF.

In one embodiment, a network node is configured to send, to a second network function (NF) associated with a network, a request for an Internet Protocol (IP) Multimedia Subsystem (IMS) information; and as a result of the request, receive a response from the second NF.

In one embodiment, a network node is configured to receive, from a second network function (NF) associated with a network, a request to subscribe to and be notified of an Internet Protocol (IP) Multimedia Subsystem (IMS) event; and as a result of the request, send a response from the second NF.

According to one aspect, a first network function (NF) implemented in a network node is described. The network node comprising a communication interface and processing circuitry in communication with the communication interface. The communication interface is configured to transmit a registration to a registry function to register an associated service profile, where the associated service profile indicates a network node capability to expose at least one of Internet Protocol (IP) Multimedia Subsystem (IMS) events and IMS analytics data on behalf of one or more IMS nodes of an IMS network; receive, from a second NF, a request to subscribe to and be notified of the at least one of the IMS events and the IMS analytics data; notify the second NF of the at least one of the IMS events and the IMS analytics data based at least in part on the received request to subscribe. The processing circuitry is configured to obtain information related to the at least one of the IMS events and the IMS analytics data from the corresponding IMS nodes in the IMS network.

In some embodiments, the associated service profile includes a list of the at least one of the IMS events and the IMS analytics data available at the network node to be registered by the network node on behalf of the IMS nodes of the IMS network.

In some other embodiments, the network node is an IMS IWF network node, and the second NF is a service consumer NF.

In an embodiment, the service consumer NF is a network analytics function (NWDAF).

In another embodiment, the service consumer NF is a central NWDAF, and the network node comprises an IMS NWDAF collecting the at least one of the IMS events and the IMS analytics data from the IMS node in the IMS network.

In some embodiments, the IMS NWDAF collects the at least one of the IMS events and the IMS analytics data from one or more of the IMS nodes in the IMS network and transmits a report to the central NWDAF based on the received request to subscribe from the central NWDAF.

In some other embodiments, the request comprises at least one of an NF identifier (ID) identifying at least one IMS node where the at least one of the IMS events and the IMS analytics data can be collected; a wireless device ID associated with one IMS event; an IMS event ID; and a correlation ID. Further, a response to the request indicates one of an acceptance and a non-acceptance of the request to subscribe.

In an embodiment, the processing circuitry is further configured to detect an occurrence of one IMS event, and the communication interface is further configured to, as a result of the request to subscribe to the at least one of the IMS events and the IMS analytics data and the detection of the at least one of the IMS events and the IMS analytics data, transmit a notification about the detection of the at least one of the IMS events and the IMS analytics data to the second NF.

In another embodiment, the communication interface is further configured to receive another request comprising one correlation ID to unsubscribe from the at least one the IMS events and the IMS analytic data; and unsubscribe the second NF from the at least one the IMS events and the IMS analytic data, as a result of the other request to unsubscribe.

In some embodiments, the at least one of the IMS events and the IMS analytics data comprises one or more of a wireless device reachability in IMS; an IMS session status; an IMS registration status; an IMS access network status; an IMS voice session establishment; an IMS voice session teardown; an emergency session (ES), IMS session status; an IMS ES establishment; an IMS ES teardown; a next generation emergency call (NG-eCall) IMS session status; an IMS eCall establishment; an IMS eCall teardown; a single radio voice call continuity (SRVCC) status; a roaming status; an access event; and a non-IMS target destination IMS session status event.

In an embodiment, the processing circuitry is further configured to obtain the information related to the at least one of the IMS events and the IMS analytics data by being configured to subscribe to the one or more IMS nodes to be notified of information related to the at least one of the IMS events and the IMS analytics data requested by the second NF; and cause the communication interface to receive the information related to the at least one of the IMS events and the IMS analytics data from the one or more of the corresponding IMS nodes.

In another embodiment, the first NF is a network function type that is the only NF consumer type for the at least one of the IMS events and IMS analytics data generated by the one or more of the corresponding IMS nodes.

In some embodiments, the registry function comprises a network repository function (NRF).

According to another aspect, a method of a first network function (NF) implemented in a network node is described. The method comprises transmitting a registration to a registry function to register an associated service profile, where the associated service profile indicates a network node capability to expose at least one of Internet Protocol (IP) Multimedia Subsystem (IMS) events and IMS analytics data on behalf of one or more IMS nodes of an IMS network; receiving, from a second NF, a request to subscribe to and be notified of the at least one of the IMS events and the IMS analytics data; obtaining information related to the at least one of the IMS events and the IMS analytics data from the corresponding IMS nodes in the IMS network; and notifying the second NF of the at least one of the IMS events and the IMS analytics data based at least in part on the received request to subscribe.

In some embodiments, the associated service profile includes a list of the at least one of the IMS events and the IMS analytics data available at the network node to be registered by the network node on behalf of the IMS nodes of the IMS network.

In some other embodiments, the network node is an IMS IWF network node, and the second NF is a service consumer NF.

In an embodiment, the service consumer NF is a network analytics function (NWDAF).

In another embodiment, the service consumer NF is a central NWDAF, and the network node comprises an IMS NWDAF collecting the at least one of the IMS events and the IMS analytics data from the IMS node in the IMS network.

In some embodiments, the IMS NWDAF collects the at least one of the IMS events and the IMS analytics data from one or more of the IMS nodes in the IMS network and transmits a report to the central NWDAF based on the received request to subscribe from the central NWDAF.

In some other embodiments, the request comprises at least one of an NF identifier (ID) identifying at least one IMS node where the at least one of the IMS events and the IMS analytics data can be collected; a wireless device ID associated with one IMS event; an IMS event ID; and a correlation ID. Further, a response to the request indicates one of an acceptance and a non-acceptance of the request to subscribe.

In an embodiment, the method further includes detecting an occurrence of one IMS event; and as a result of the request to subscribe to the at least one of the IMS events and the IMS analytics data and the detection of the at least one of the IMS events and the IMS analytics data, transmitting a notification about the detection of the at least one of the IMS events and the IMS analytics data to the second NF.

In another embodiment, the method further includes receiving another request comprising one correlation ID to unsubscribe from the at least one the IMS events and the IMS analytic data; and unsubscribing the second NF from the at least one the IMS events and the IMS analytic data, as a result of the other request to unsubscribe.

In some embodiments, the at least one of the IMS events and the IMS analytics data comprises one or more of a wireless device reachability in IMS; an IMS session status; an IMS registration status; an IMS access network status; an IMS voice session establishment; an IMS voice session teardown; an emergency session, ES, IMS session status; an IMS ES establishment; an IMS ES teardown; a next generation emergency call (NG-eCall) IMS session status; an IMS eCall establishment; an IMS eCall teardown; a single radio voice call continuity (SRVCC) status; a roaming status; an access event; and a non-IMS target destination IMS session status event.

In some other embodiments, the obtaining of the information related to the at least one of the IMS events and the IMS analytics data further includes subscribing to the one or more IMS nodes to be notified of information related to the at least one of the IMS events and the IMS analytics data requested by the second NF; and receiving the information related to the at least one of the IMS events and the IMS analytics data from the one or more of the corresponding IMS nodes.

In an embodiment, the first NF is a network function type that is the only NF consumer type for the at least one of the IMS events and IMS analytics data generated by the one or more of the corresponding IMS nodes.

In another embodiment, the registry function comprises a network repository function (NRF).

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
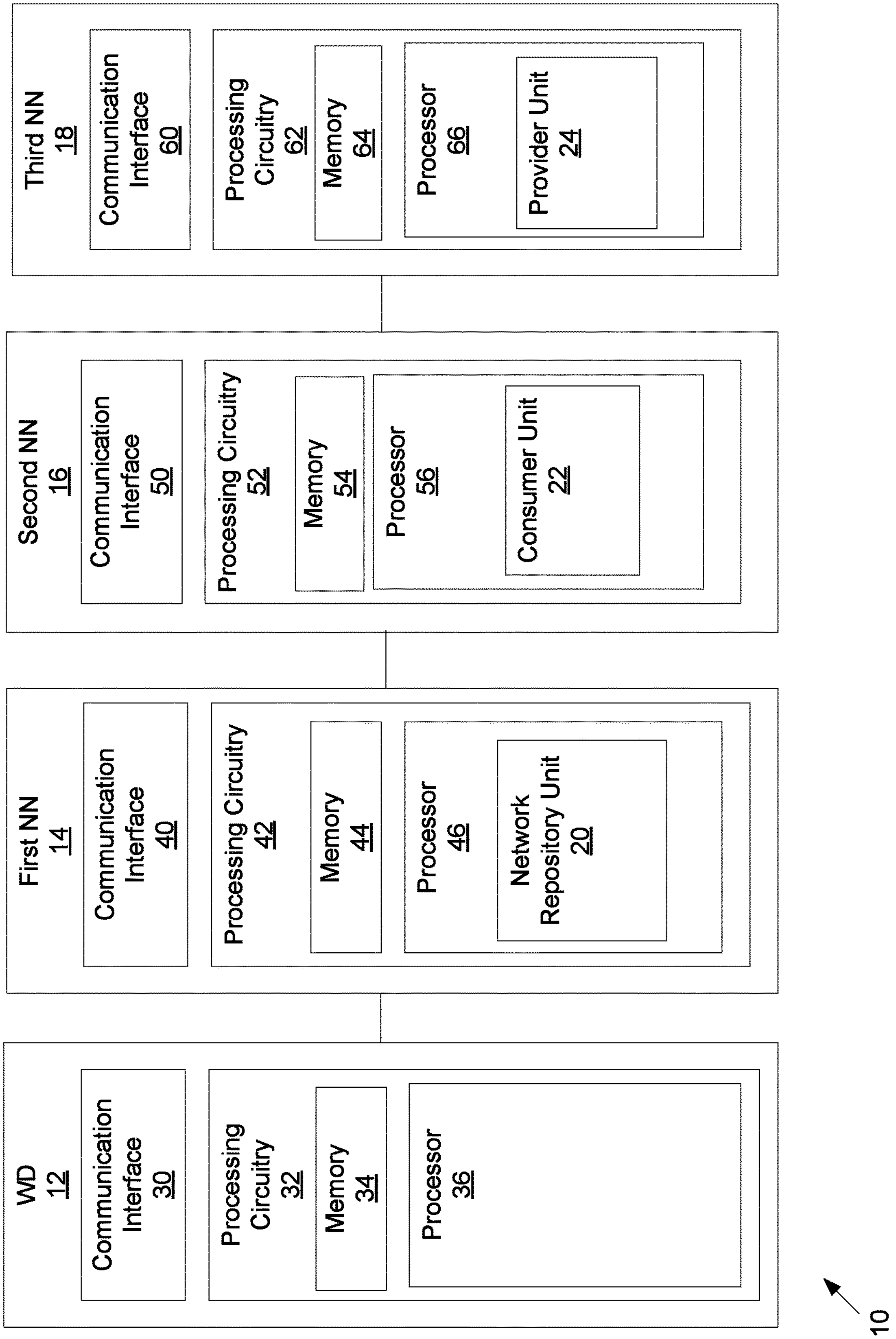
FIG. 1 illustrates an example system architecture and example hardware arrangements for devices in the system, according to some embodiments of the present disclosure.

Some embodiments provide arrangements for data collection (e.g., all data collection from 5GC, IMS, etc.) to be integrated via the NWDAF. Some embodiments provide arrangements for such integration to be a future proof way of integrating IMS and IMS nodes with NWDAF in an efficient way. Existing technology does not include a solution to integrate IMS with NWDAF.

In some embodiments, an interworking function (IWF) is proposed to enable interworking between NWDAF and IMS. In some embodiments, the reference points between IMS, and IMS nodes and the (IWF) may be left undefined to cater to different proprietary implementations.

Two nonlimiting embodiments/options/examples may be defined:

In option 1, the IMS nodes' supported events and analytics may be configured in the IMS IWF. The IWF may publish in (or otherwise provide for) the network repository function (NRF) in its profile what is supported in the IWF and/or what is available to being requested by (or otherwise provided to) a third party.

In option 2, the IMS nodes publish (or otherwise provide) their profile in the NRF directly. Information (e.g., associated with the published profile) can be only consumed by the IMS IWF; or IMS nodes can publish (or otherwise provide) their profile directly on behalf of IMS IWF.

Some embodiments of the present disclosure provide a simple solution that extends existing capabilities of the 5GC, IMS and/or NWDAF and includes enablers (e.g., features) that provide flexibility. Some other embodiments of the present disclosure provide an IWF and its application programming interface (API) which includes one or more of: registering its profile to the NRF (e.g., where the profile indicates the IWF) as providing IMS events, receiving the analytics events from the IMS nodes in an IMS network, and delivering/notifying a NWDAF upon subscription (e.g., by NWDAF to events from the IMS nodes). The IWF may be configured to expose its services to be discovered by the NWDAF. The types of analytic events related to IMS that can be exposed via the IWF are described in more detail herein below.

Before describing in detail example embodiments, it is noted that the embodiments reside primarily in combinations of apparatus components and processing steps related to IMS support for NWDAF. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The WD herein can be any type of wireless device capable of communicating with a network node or another WD over radio signals. In some embodiments, the WD may be an autonomous machine configured to communicate via IMS. The WD herein can by any type of communication device capable of communicating with another WD, an application server, a network node, a server, an IMS NF or other IMS network node, via a wired connection and/or a wireless connection. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

In some embodiments, the terms "node" and interchangeably "network node" are used herein and can be any kind of network node, such as, an application function (AF) node, a network function (NF) node, a mobility management node (e.g., Mobility Management Entity (MME) and/or Access and Mobility Function (AMF)), a gateway (e.g., access gateway), a session management node (e.g., session management function (SMF) node), a user plane function (UPF) node or any network node. In some embodiments, the network node may be, for example, a subscriber database node, a core network node, a Fifth Generation (5G) and/or New Radio (NR) network node, an Evolved Packet System (EPS) node, an Internet Protocol (IP) Multimedia Subsystem (IMS) node, IWF, IMS IWF, NWDAF, such as, a Proxy-Call Session Control Function (P-CSCF) node, a Serving-CSCF node, Emergency Call Session Control Function (E-CSCF), an Interrogating-CSCF node, Application Server (AS). In some embodiments, the network node can be a network repository function (NRF) node, a unified data management (UDM) node, a Network Exposure Function (NEF) node, a home subscriber server (HSS) node, a home location register (HLR) node, etc.

In yet other embodiments, the network node may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, one or more of the nodes described herein may be more generally considered and/or comprise a network function (NF) and may be referred to as a NF node.

In some embodiments, a Third Generation Partnership Project (3GPP) core network (e.g., 5GC) may include a Service Based Architecture (SBA) in which Network Functions (NFs) provide one or more services to one or more service consumers. This can be performed, for example, via Hyper Text Transfer Protocol/Representational State Transfer (HTTP/REST), application programming interfaces (APIs), etc. Generally, the various services may be considered self-contained functionalities that can be changed and modified in an isolated manner without affecting other services. Furthermore, the services may include various service operations, which may be more granular divisions of the overall service functionality. In some embodiments, in order to access a service, both the service name and the targeted service operation is to be indicated. The interactions between service consumers and service producers may be, for example, a "request/response" or "subscribe/notify" type or yet other types of interactions. In some embodiments, a network repository functions (NRF) may allow NFs to discover the services offered by other NFs, and Data Storage Functions (DSFs) may allow NFs to store its context. In some embodiments, the 5GC SBA model may provide e.g., modularity, reusability and/or self-containment of NFs, which may be compatible with virtualization technologies.

In some embodiments, one or more of the nodes described herein may be more generally considered and/or comprise an application function (AF).

An AF may interact with a 3GPP core network to provide one or more of services. Based on operator deployment, an AF may be trusted by the operator to interact directly with relevant network functions (NFs). AFs not permitted by the operator to access directly the NFs may use, for example, an external exposure framework (e.g., via a network exposure function (NEF)) to interact with relevant NFs. In some embodiments, the AF may provide one or more services to a user/WD, in which, for example, a packet-based service data flow is provided to the user/WD, e.g., the streaming of video and/or audio data packets from a content provider to a subscriber of a mobile communications network. The AF may for example be attached to or part of the 3GPP Policy and Charging (PCC) architecture and may be specified in one or more particular 3GPP Technical Specifications.

In some embodiments, the various AF nodes and NF nodes that may be described herein may be referred to by their function names and/or more generally as network nodes and/or nodes.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Note that although terminology from one particular wireless system, such as, for example, 3$^{rd}$ Generation Partnership Project (3GPP), Long Term Evolution (LTE), 5th Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

It should be understood that the services, flags, events and/or messages discussed in the present disclosure may have any name and may not be limited to the specific names used herein, which may be example and/or descriptive, since the service, flag or event or message may, for example, be given another name in a technical specification, such as a 3GPP Technical Specification (TS) even though the use/function is as disclosed in the present disclosure. For example, the service called Nims_EventExposure herein may, in some embodiments, be called Niwf_EventExposure.

Note further, that functions described herein as being performed by a network node may be performed by a plurality of network node. In other words, it is contemplated that the functions of the network nodes described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of the system 10, according to another embodiment, constructed in accordance with the principles of the present disclosure. The system 10 in FIG. 1 is a non-limiting example and other embodiments of the present disclosure may be implemented by one or more other systems and/or networks. Referring to FIG. 1, system 10 may include one or more WDs (e.g., WD 12*a*, WD 12*b*, etc., collectively referred to as, WD 12), in addition to various support elements for supporting communications, such as, a radio access network (RAN), which may provide radio access to the WD 12. The system 10 may further include a first network node (NN) 14, a second NN 16 and a third NN 18 (and/or other NNs), which may be comprised in for example a 5GC network.

In some embodiments, the first NN 14 may include a network repository unit 20 configured to perform any step and/or task and/or process and/or method and/or feature described in the present disclosure, e.g., cause the first NN 14 to receive, from a consumer network function, NF, associated with a network, a request for an Internet Protocol (IP) Multimedia Subsystem (IMS) information; as a result of the request for IMS information, identify a provider NF associated with an IMS interworking function (IWF); and send a response to the consumer NF based on the identification of the provider NF.

The second NN 16 may include a consumer unit 22 configured to perform any step and/or task and/or process and/or method and/or feature described in the present disclosure, e.g., cause the second NN 16 to send, to a second network function (NF) associated with a network, a request for an Internet Protocol (IP) Multimedia Subsystem (IMS) information; and as a result of the request, receive a response from the second NF.

The third NN 18 may include a provider unit 24 configured to perform any step and/or task and/or process and/or method and/or feature described in the present disclosure, e.g., cause the third NN 18 to receive, from a second network function (NF) associated with a network, a request to subscribe to and be notified of an Internet Protocol (IP) Multimedia Subsystem (IMS) event; and as a result of the request, send a response from the second NF.

Example implementations, in accordance with an embodiment, of the WD 12, first NN 14, second NN 16 and third NN 18 discussed in the preceding paragraphs will now be described with reference to FIG. 1.

The WD 12 includes a communication interface 30, processing circuitry 32, and memory 34. The communication interface 30 may be configured to communicate with other elements in the system 10. In some embodiments, the communication interface 30 may be formed as or may include, for example, one or more radio frequency (RF) transmitters, one or more RF receivers, and/or one or more RF transceivers, and/or may be considered a radio interface. In some embodiments, the communication interface 30 may also include a wired interface.

The processing circuitry 32 may include one or more processors 36 and memory, such as, the memory 34. In particular, in addition to a traditional processor and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 12 may further include software stored internally in, for example, memory 34, or stored in external memory (e.g., database) accessible by the WD 12 via an external connection. The software may be executable by the processing circuitry 32. The processing circuitry 32 may be configured to control any of the methods and/or processes described herein and/or to cause such methods, and/or processes to be performed, e.g., by the WD 12. The memory 34 is configured to store data, programmatic software code and/or other information described herein. In some embodiments, the software may include instructions stored in memory 34 that, when executed by the processor 36 causes the processing circuitry 32 and/or configures the WD 12 to perform the processes described herein with respect to the WD 12.

The first NN 14 includes a communication interface 40, processing circuitry 42, and memory 44. The communication interface 40 may be configured to communicate with the WD 12 and/or other elements in the system 10. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may also include a wired interface.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first NN 14 may further include software stored internally in, for example, memory 44, or stored in external memory (e.g., database) accessible by the first NN 14 via an external connection. The software may be executable by the processing circuitry 42. The processing circuitry 42 may be configured to control any of the methods and/or processes described herein and/or to cause such methods, and/or processes to be performed, e.g., by the first NN 14. The memory 44 is configured to store data, programmatic software code and/or other information described herein. In some embodiments, the software may include instructions stored in memory 44 that, when executed by the processor 46 and/or network repository unit 20, causes the processing circuitry 42 and/or configures the first NN 14 to perform the processes described herein with respect to the first NN 14 (e.g., processes described with reference to FIG. 3 and/or any of the other figures).

The second NN 16 includes a communication interface 50, processing circuitry 52, and memory 54. The communication interface 50 may be configured to communicate with the WD 12 and/or other elements in the system 10. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second NN 16 may further include software stored internally in, for example, memory 54, or stored in external memory (e.g., database) accessible by the second NN 16 via an external connection. The software may be executable by the processing circuitry 52. The processing circuitry 52 may be configured to control any of the methods and/or processes described herein and/or to cause such methods, and/or processes to be performed, e.g., by the second NN 16. The memory 54 is configured to store data, programmatic software code and/or other information described herein. In some embodiments, the software may include instructions stored in memory 54 that, when executed by the processor 56 and/or consumer unit 22, causes the processing circuitry 52 and/or configures the second NN 16 to perform the processes described herein with respect to the second NN 16 (e.g., processes described with reference to FIG. 3 and/or any of the other figures).

The third NN 18 includes a communication interface 60, processing circuitry 62, and memory 64. The communication interface 60 may be configured to communicate with the WD 12 and/or other elements in the system 10. In some embodiments, the communication interface 60 may be formed as or may include, for example, one or more radio frequency (RF) transmitters, one or more RF receivers, and/or one or more RF transceivers, and/or may be considered a radio interface. In some embodiments, the communication interface 60 may also include a wired interface.

The processing circuitry 62 may include one or more processors 66 and memory, such as, the memory 64. In particular, in addition to a traditional processor and memory, the processing circuitry 62 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 64, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the third NN 18 may further include software stored internally in, for example, memory 64, or stored in external memory (e.g., database) accessible by the third NN 18 via an external connection. The software may be executable by the processing circuitry 62. The processing circuitry 62 may be configured to control any of the methods and/or processes described herein and/or to cause such methods, and/or processes to be performed, e.g., by the third NN 18. The memory 64 is configured to store data, programmatic software code and/or other information described herein. In some embodiments, the software may include instructions stored in memory 64 that, when executed by the processor 66 and/or provider unit 24, causes the processing circuitry 62 and/or configures the third NN 18 to perform the processes described herein with respect to the third NN 18 (e.g., processes described with reference to FIG. 4 and/or any of the other figures).

In FIG. 1, the connection between the devices WD 12, first, second and third NNs 14, 16, 18 is shown without explicit reference to any intermediary devices or connections. However, it should be understood that intermediary devices and/or connections may exist between these devices, although not explicitly shown.

Although FIG. 1 shows network repository unit 20, consumer unit 22 and provider unit 24, as being within a respective processor, it is contemplated that these units may be implemented such that a portion of the units is stored in a corresponding memory within the processing circuitry. In other words, the units may be implemented in hardware or in a combination of hardware and software within the processing circuitry.

Figure 7:
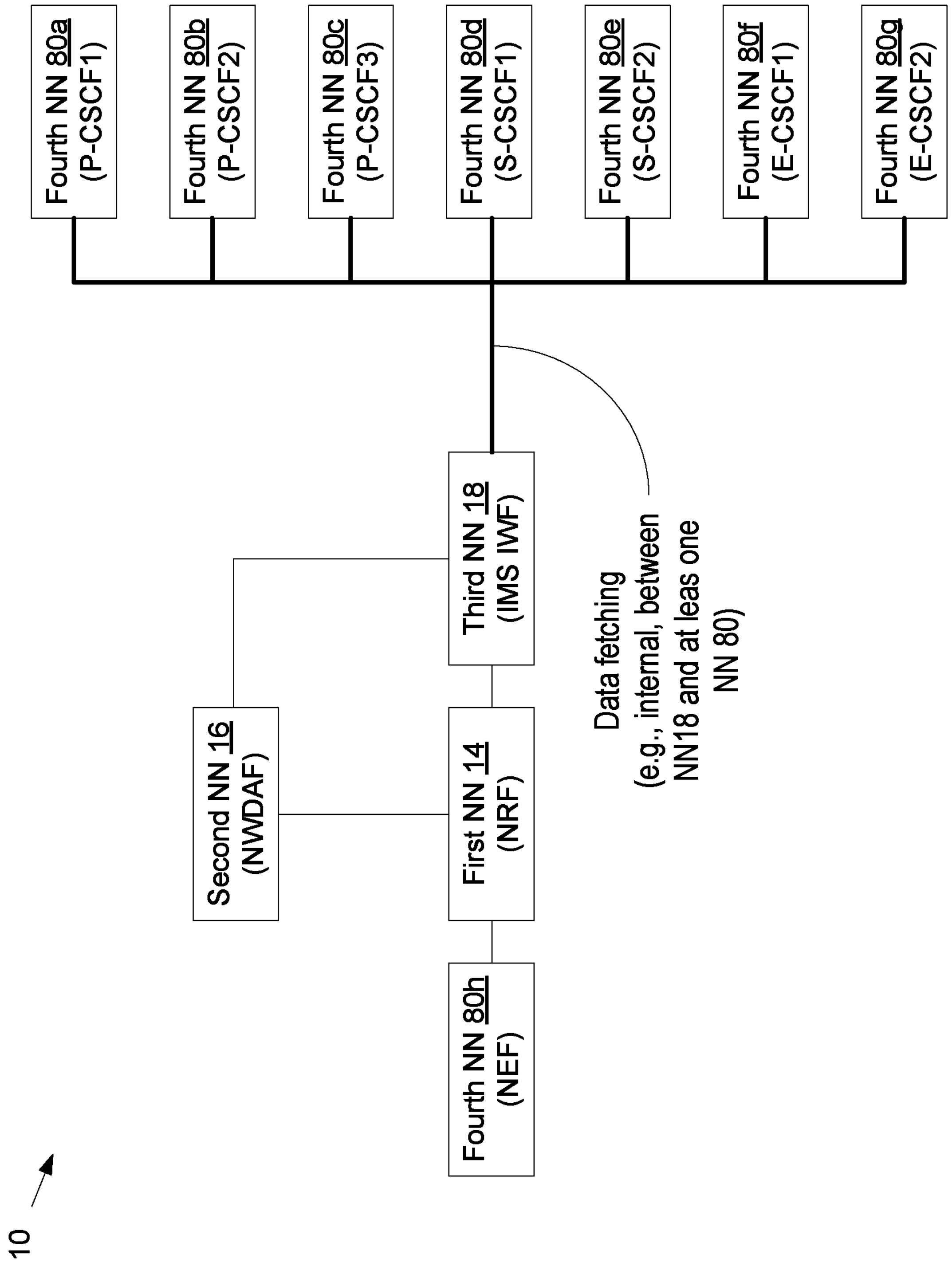
FIG. 7 depicts an example architecture, e.g., for option 1, according to some embodiments of the present disclosure.
Figure 8:
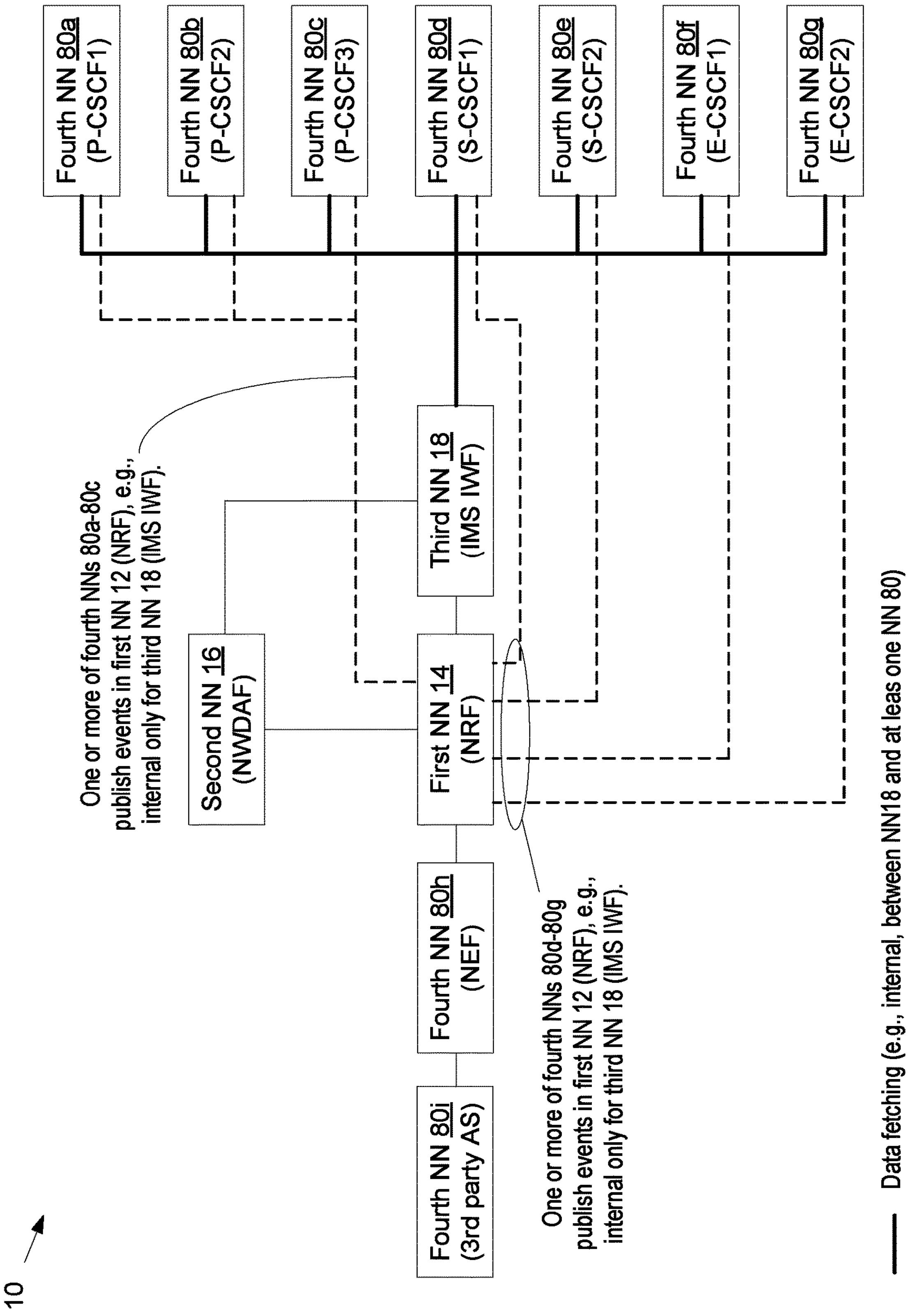
FIG. 8 depicts another example architecture, e.g., for option 2, according to some embodiments of the present disclosure.

In some embodiments, the inner workings of the nodes from FIG. 1 may be as shown in FIG. 1 and independently, the surrounding network topology may be that of FIG. 7 or 8.

Figure 2:
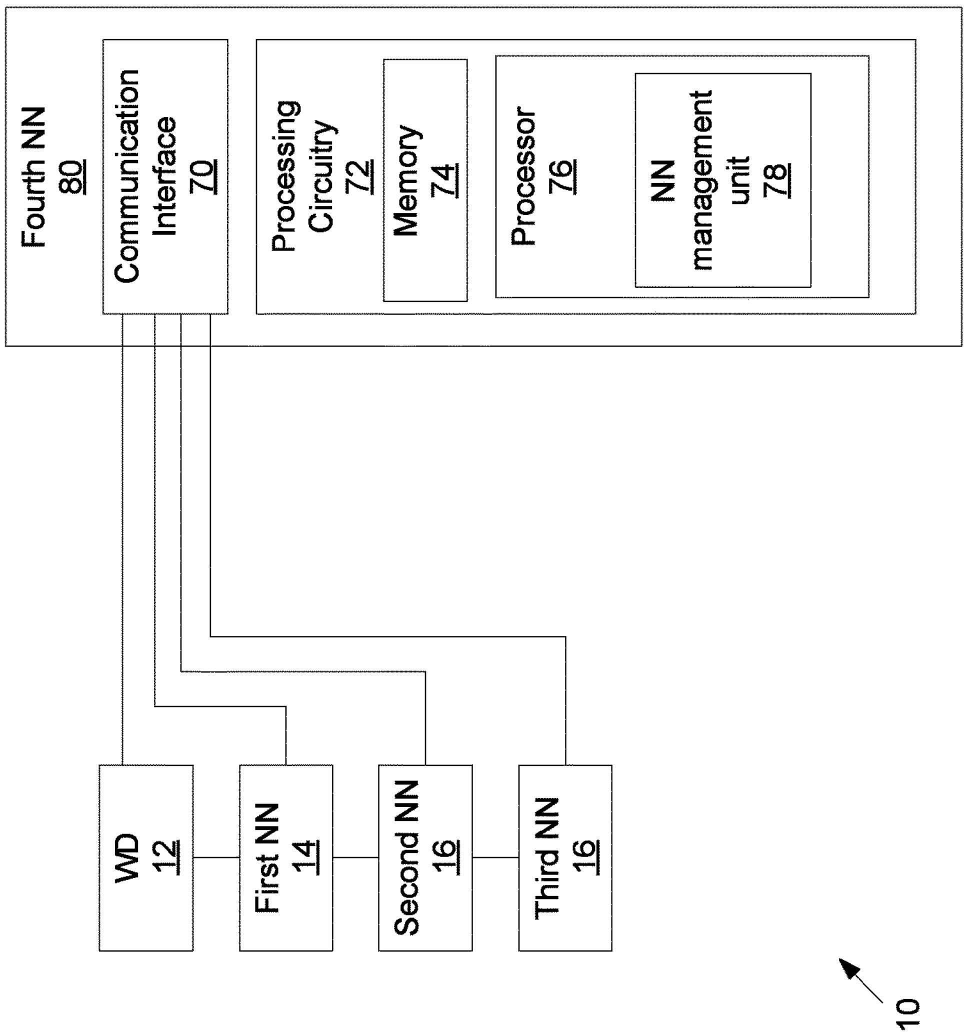
FIG. 2 illustrates another example system architecture and example hardware arrangements for devices in the system, according to some embodiments of the present disclosure.

FIG. 2 shows another schematic diagram of the system 10, according to one embodiment, constructed in accordance with the principles of the present disclosure. System 10 may include WD 12, a first NN 14, a second NN 16, and a third NN 18 (e.g., as described with respect to FIG. 1). Further, system 10 may include a fourth NN 80.

The fourth NN 80 includes a communication interface 70, processing circuitry 72, and memory 74. The communication interface 70 may be configured to communicate with the any elements in the system 10. In some embodiments, the communication interface 70 may be formed as or may include, for example, one or more radio frequency (RF) transmitters, one or more RF receivers, and/or one or more RF transceivers, and/or may be considered a radio interface. In some embodiments, the communication interface 70 may also include a wired interface.

The processing circuitry 72 may include one or more processors 76 and memory, such as, the memory 74. In particular, in addition to a traditional processor and memory, the processing circuitry 72 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) the memory 74, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the fourth NN 80 may further include software stored internally in, for example, memory 74, or stored in external memory (e.g., database) accessible by the fourth NN 80 via an external connection. The software may be executable by the processing circuitry 72. The processing circuitry 72 may be configured to control any of the methods and/or processes described herein and/or to cause such methods, and/or processes to be performed, e.g., by the fourth NN 80. The memory 74 is configured to store data, programmatic software code and/or other information described herein. In some embodiments, the software may include instructions stored in memory 74 that, when executed by the processor 76 and/or NN management unit 78, causes the processing circuitry 72 and/or configures the fourth NN 80 to perform the processes described herein with respect to the fourth NN 80.

The fourth network node may further include the NN management unit 78 configured to perform any step and/or task and/or process and/or method and/or feature described in the present disclosure, e.g., register a profile, provide IMS events and the IMS analytics data, perform one or more functions of an application server and/or NEF, etc. In some embodiments, the fourth network node 80 (and/or NN management unit 78) may be configured to perform one or more functions of WD 12, first NN 14, second NN 16, and third NN 18. 3

Although FIG. 2 shows NN management unit 78, as being within a respective processor, it is contemplated that this unit may be implemented such that a portion of the unit is stored in a corresponding memory within the processing circuitry. In other words, the unit may be implemented in hardware or in a combination of hardware and software within the processing circuitry.

In some embodiments, the inner workings of the nodes from FIG. 2 may be as shown in FIG. 2 and independently, the surrounding network topology may be that of FIG. 7 or 8.

Figure 3:
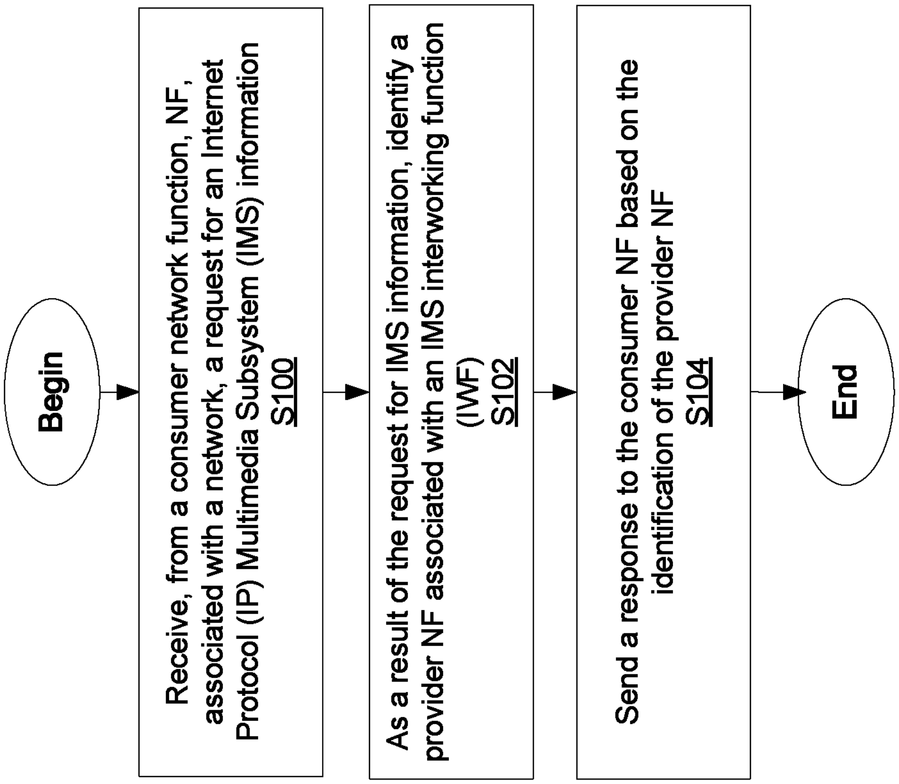
FIG. 3 is a flowchart of an example process in a first network node (e.g., NRF) according to some embodiments of the present disclosure.

FIG. 3 is a flowchart of an example process in a first NN 14 (e.g., NRF). One or more Blocks and/or functions and/or methods performed by the first NN 14 may be performed by one or more elements of first NN 14 such as by network repository unit 20 in processing circuitry 42, memory 44, processor 46, communication interface 40, etc. according to the example process/method. The example process includes receiving (Block S100), such as via network repository unit 20 in processing circuitry 42, memory 44, processor 46 and/or communication interface 40, from a consumer network function, NF, associated with a network, a request for an Internet Protocol (IP) Multimedia Subsystem (IMS) information. The process includes as a result of the request for IMS information, identifying (Block S102), such as via network repository unit 20 in processing circuitry 42, memory 44, processor 46 and/or communication interface 40, a provider NF associated with an IMS interworking function (IWF). The process includes sending (Block S104), such as via network repository unit 20 in processing circuitry 42, memory 44, processor 46 and/or communication interface 40, a response to the consumer NF based on the identification of the provider NF.

In some embodiments, the response comprises information about the provider NF, the information about the NF provider comprises at least one of: an NF identifier (ID) identifying the provider NF and/or the IMS IWF, information indicating a location of the provider NF and/or the IMS IWF and information identifying services, analytics and/or events supported by the provider NF and/or the IMS IWF.

In some embodiments, the network node comprises a network repository function, NRF, and the network is a 3GPP 5th Generation Core Network (5GC). In some embodiments, the method further includes receiving, such as via network repository unit 20 in processing circuitry 42, memory 44, processor 46 and/or communication interface 40, a registration of a profile for the provider NF in IMS and/or the IMS IWF, the profile indicating services, analytics and/or events supported by the provider NF in IMS and/or the IMS IWF.

In some embodiments, the provider NF comprises the IMS IWF; the services, analytics and/or events supported by the IMS IWF are configured in the IMS IWF and the profile of the IMS IWF is published by the IMS IWF in the network node. In some embodiments, the provider NF is an IMS network node associated with the IMS IWF; services, analytics and/or events supported by the IMS network node are configured in the IMS network node and the profile of the IMS network node is published by the IMS node in the network node. In some embodiments, the consumer NF comprises a network data analytics function (NWDAF).

Figure 4:
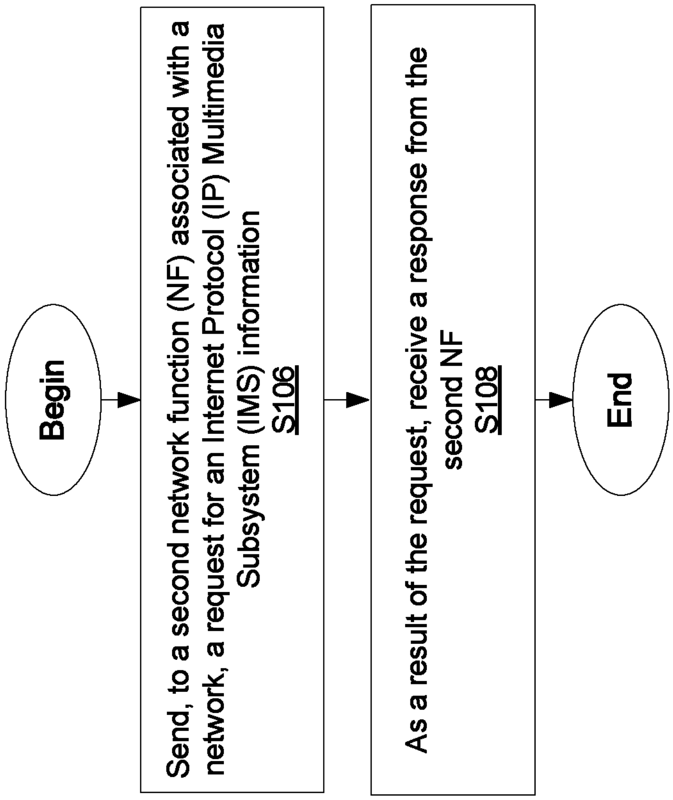
FIG. 4 is a flowchart of an example process in a second network node (e.g., consumer NF) according to some embodiments of the present disclosure.

FIG. 4 is a flowchart of an example process in a second NN 16 (e.g., consumer NF). One or more Blocks and/or functions and/or methods performed by the second NN 16 may be performed by one or more elements of second NN 16 such as consumer unit 22 in processing circuitry 52, memory 54, processor 56, communication interface 50, etc. according to the example process/method. The example process includes sending (Block S106), such as via consumer unit 22 in processing circuitry 52, memory 54, processor 56, communication interface 50, to a second network function (NF) associated with a network, a request for an Internet Protocol (IP) Multimedia Subsystem (IMS) information. The process includes as a result of the request, receiving (Block S108), consumer unit 22 in processing circuitry 52, memory 54, processor 56, communication interface 50, a response from the second NF.

In some embodiments, the network node comprises a consumer NF and the network is a 3GPP 5th Generation Core Network (5GC). In some embodiments, the second NF comprises a network repository function, NRF, and the response comprises information about a provider NF associated with an IMS interworking function (IWF), the information about the provider NF comprises at least one of: an NF identifier (ID) identifying the provider NF and/or the IMS IWF, information indicating a location of the provider NF and/or the IMS IWF and information identifying services, analytics and/or events supported by the provider NF and/or the IMS IWF.

In some embodiments, the second NF is an IMS network node or IMS IWF network node and the request comprises a request to subscribe to and be notified of an IMS event, the request comprising at least one of: an NF ID identifying the IMS network node or IMS IWF network node, a WD ID associated with the IMS event, an event ID and a correlation ID and the response indicating one of acceptance and non-acceptance of the requested subscription.

In some embodiments, the method includes as a result of the subscription, receiving, such as via consumer unit 22 in processing circuitry 52, memory 54, processor 56, communication interface 50, a notification of a detection of the IMS event from the IMS network node or IMS IWF network node. In some embodiments, the IMS event comprises at least one of: an IMS session, IMS registration status, IMS access network and roaming. In some embodiments, the method includes sending, such as via consumer unit 22 in processing circuitry 52, memory 54, processor 56, communication interface 50, a request comprising the correlation ID to unsubscribe to the IMS event.

Figure 5:
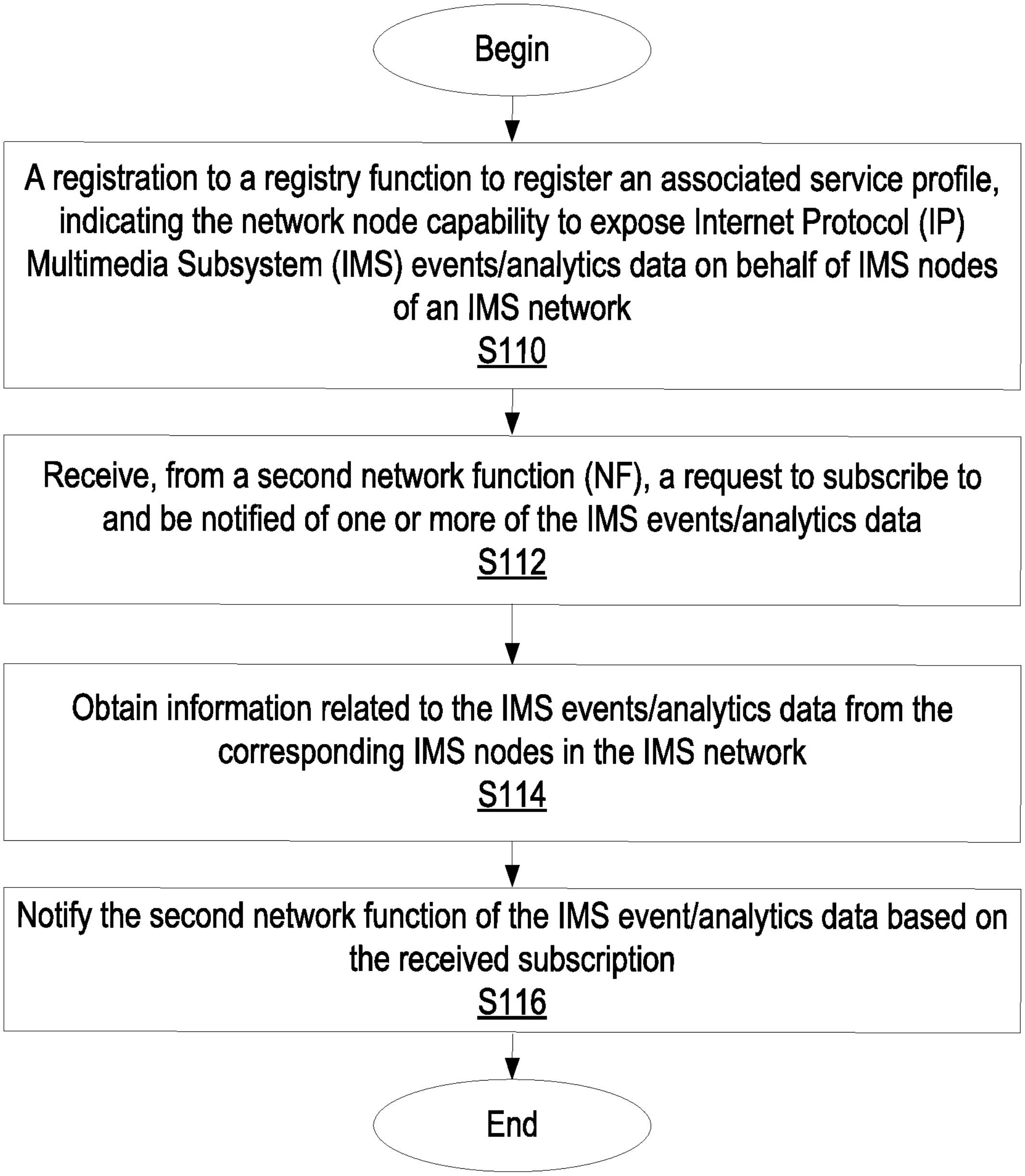
FIG. 5 is a flowchart of an example process in a third network node (provider NF) according to some embodiments of the present disclosure.

FIG. 5 is a flowchart of an example process in a third NN 18 (e.g., provider NF). One or more Blocks and/or functions and/or methods performed by the third NN 18 may be performed by one or more elements of third NN 18 such as provider unit 24 in processing circuitry 62, memory 64, processor 66, communication interface 60, etc. according to the example process/method. The example process includes transmitting (Block S110), such as via provider unit 24 in processing circuitry 62, memory 64, processor 66, communication interface 60, a registration to a registry function to register an associated service profile, indicating the network node capability to expose Internet Protocol (IP) Multimedia Subsystem (IMS) events/analytics data on behalf of IMS nodes of an IMS network. The method includes receiving (Block S112), such as via provider unit 24 in processing circuitry 62, memory 64, processor 66, communication interface 60, from a second network function (NF), a request to subscribe to and be notified of one or more of the IMS events/analytics data. The method includes obtaining (Block S114), such as via provider unit 24 in processing circuitry 62, memory 64, processor 66, communication interface 60, information related to the IMS events/analytics data from the corresponding IMS nodes in the IMS network. The method includes notifying (Block S116), such as via provider unit 24 in processing circuitry 62, memory 64, processor 66, communication interface 60, the second network function of the IMS event/analytics data based on the received subscription.

In some embodiments, the associated service profile includes a list of the IMS events available at the network node to be registered by the network node on behalf of the IMS nodes of the IMS network. In some embodiments, the network node is an IMS network node or an IMS IWF network node, the second NF is a service consumer NF. In some embodiments, the service consumer NF is a network analytics function (NWDAF). In some embodiments, the service consumer NF is a central network analytics function (NWDAF), and the network node is an IMS NWDAF collecting events/analytics data from the IMS node in the IMS network behaving as an IMS IWF.

In some embodiments, the IMS NWDAF collects events/analytics data from one or more of the IMS nodes in the IMS network and transmits a report to the central NWDAF based on the received subscription from the central NWDAF. In some embodiments, the subscription request from the central NWDAF comprises at least one of: an NF ID identifying the IMS node or IMS IWF node, a WD ID associated with the IMS event, an event ID and a correlation ID and the response indicates one of acceptance and non-acceptance of the requested subscription. In some embodiments, the method includes detecting, such as via provider unit 24 in processing circuitry 62, memory 64, processor 66, communication interface 60, an occurrence of the IMS event. The method includes as a result of the subscription and the detection of the IMS event, sending, such as via provider unit 24 in processing circuitry 62, memory 64, processor 66, communication interface 60, a notification about the detection of the IMS event to the second NF.

In some embodiments, the IMS event comprises at least one of: an IMS session, IMS registration status of one or more WD, IMS access network used by one or more WD and roaming status of one or more WD. In some embodiments, the method includes receiving, such as via provider unit 24 in processing circuitry 62, memory 64, processor 66, communication interface 60, a request comprising the correlation ID to unsubscribe to the IMS event and unsubscribe the second NF to the IMS event as a result of the request to unsubscribe.

In some embodiments, the list of the IMS events comprises one or more of: WD reachability in IMS, IMS session status, IMS voice session establishment, IMS voice session teardown, ES IMS session status, IMS ES establishment, IMS ES teardown, NG-eCall IMS session status, IMS eCall establishment, IMS eCall teardown, SRVCC status, roaming status, access event and non-IMS target destination IMS session status event.

In some embodiments, the method further includes subscribing, such as via provider unit 24 in processing circuitry 62, memory 64, processor 66, communication interface 60, to one or more second associated profiles, of one or more of the corresponding IMS nodes, the one or more second associated profiles of the one or more corresponding IMS nodes being registered directly with the registry function; and receiving, such as via provider unit 24 in processing circuitry 62, memory 64, processor 66, communication interface 60, the information related to the IMS events/analytics data from the one or more corresponding IMS nodes, as a result of the subscription to the one or more of second associated profiles.

In some embodiments, the network function is of a network function type that is the only NF consumer type for the one or more of the corresponding IMS nodes; and the NF consumer type is an IMS IWF/IMS-NWDAF consumer type. In some embodiments, the registry function comprises a network repository function (NRF).

According to another embodiment, a method is provided that includes receiving, such as via provider unit 24 in processing circuitry 62, memory 64, processor 66, communication interface 60, from a second network function (NF) associated with a network, a request to subscribe to and be notified of an Internet Protocol (IP) Multimedia Subsystem (IMS) event. The method includes as a result of the request, sending, such as via provider unit 24 in processing circuitry 62, memory 64, processor 66, communication interface 60, a response from the second NF.

In some embodiments, the network node is an IMS network node or an IMS IWF network node, the second NF is a consumer NF, and the network is a 3GPP 5th Generation Core Network (5GC). In some embodiments, the method further includes registering, such as via provider unit 24 in processing circuitry 62, memory 64, processor 66, communication interface 60, a profile in a network repository function, NRF, the profile indicating IMS services, analytics and/or events supported by the network node, i.e., IMS node registering the supported IMS events or the IMS IWF node that registers the supported IMS events on behalf of the IMS nodes. In some embodiments, the subscription request from an NF consumer to the IMS IWF/IMS NWDAF comprises a request to subscribe to and be notified of the one or more IMS event registered in the NRF by the IMS node or the IMS IWF on behalf of the IMS node, the request comprising at least one of: an NF ID identifying the IMS node, a WD ID associated with the IMS event, one or more IMS event ID and a correlation ID and the response indicates one of acceptance and non-acceptance of the requested subscription.

In some embodiments, the method further includes detecting, such as via provider unit 24 in processing circuitry 62, memory 64, processor 66, communication interface 60, an occurrence of the IMS event; and as a result of the subscription and the detection of the IMS event, sending, such as provider unit 24 in processing circuitry 62, memory 64, processor 66, communication interface 60, a notification about the detection of the IMS event to the second NF (the subscribed NF consumer). In some embodiments, the IMS event comprises at least one of: an IMS session, IMS registration status, IMS access network and roaming. In some embodiments, the method further includes receiving, such as via provider unit 24 in processing circuitry 62, memory 64, processor 66, communication interface 60, a request comprising the correlation ID to unsubscribe to the IMS event and unsubscribe the second NF to the IMS event as a result of the request to unsubscribe.

Figure 6:
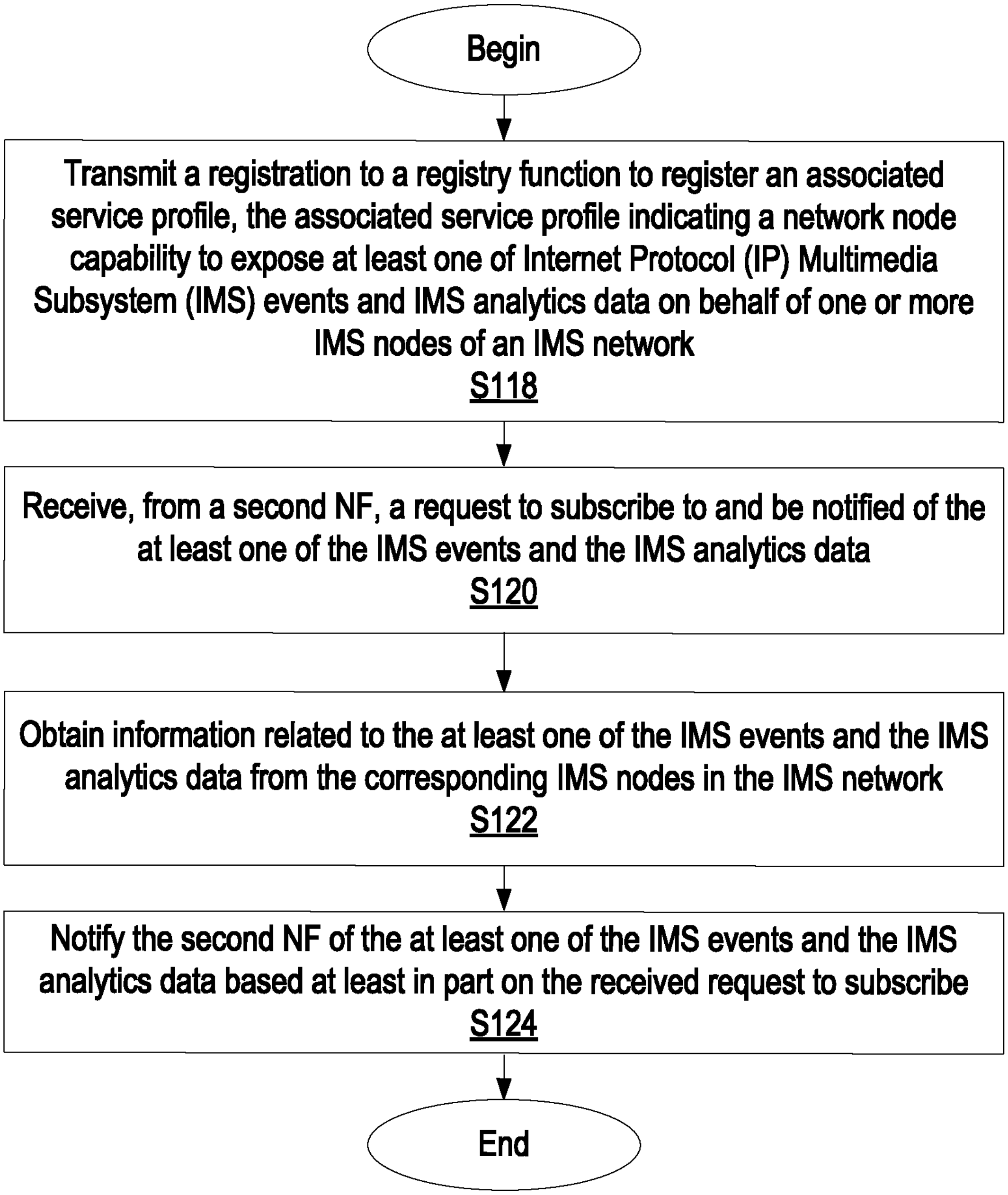
FIG. 6 is a flowchart of another example process in a third network node (provider NF) according to some embodiments of the present disclosure.

FIG. 6 is a flowchart of another example process in a third NN 18 (e.g., provider NF). One or more Blocks and/or functions and/or methods performed by the third NN 18 may be performed by one or more elements of third NN 18 such as provider unit 24 in processing circuitry 62, memory 64, processor 66, communication interface 60, etc. according to the example process/method. The example process includes transmitting (Block S110), such as via provider unit 24 in processing circuitry 62, memory 64, processor 66, communication interface 60, transmit (Block S118) a registration to a registry function to register an associated service profile, where the associated service profile indicates a network node capability to expose at least one of Internet Protocol (IP) Multimedia Subsystem (IMS) events and IMS analytics data on behalf of one or more IMS nodes of an IMS network; receive (Block S120), from a second NF, a request to subscribe to and be notified of the at least one of the IMS events and the IMS analytics data; obtain (Block S122) information related to the at least one of the IMS events and the IMS analytics data from the corresponding IMS nodes in the IMS network; and notify (Block S124) the second NF of the at least one of the IMS events and the IMS analytics data based at least in part on the received request to subscribe.

In some embodiments, the associated service profile includes a list of the at least one of the IMS events and the IMS analytics data available at the network node (18) to be registered by the network node (18) on behalf of the IMS nodes of the IMS network.

In some other embodiments, the network node (18) is an IMS IWF network node, and the second NF is a service consumer NF.

In an embodiment, the service consumer NF is a network analytics function (NWDAF).

In another embodiment, the service consumer NF is a central NWDAF, and the network node (18) comprises an IMS NWDAF collecting the at least one of the IMS events and the IMS analytics data from the IMS node in the IMS network.

In some embodiments, the IMS NWDAF collects the at least one of the IMS events and the IMS analytics data from one or more of the IMS nodes in the IMS network and transmits a report to the central NWDAF based on the received request to subscribe from the central NWDAF.

In some other embodiments, the request comprises at least one of an NF identifier (ID) identifying at least one IMS node where the at least one of the IMS events and the IMS analytics data can be collected; a wireless device ID associated with one IMS event; an IMS event ID; and a correlation ID. Further, a response to the request indicates one of an acceptance and a non-acceptance of the request to subscribe.

In an embodiment, the method further includes detecting an occurrence of one IMS event; and, as a result of the request to subscribe to the at least one of the IMS events and the IMS analytics data and the detection of the at least one of the IMS events and the IMS analytics data, transmitting a notification about the detection of the at least one of the IMS events and the IMS analytics data to the second NF.

In another embodiment, the method further includes receiving another request comprising one correlation ID to unsubscribe from the at least one the IMS events and the IMS analytic data; and unsubscribing the second NF from the at least one the IMS events and the IMS analytic data, as a result of the other request to unsubscribe.

In some embodiments, the at least one of the IMS events and the IMS analytics data comprises one or more of a wireless device reachability in IMS; an IMS session status; an IMS registration status; an IMS access network status; an IMS voice session establishment; an IMS voice session teardown; an emergency session, ES, IMS session status; an IMS ES establishment; an IMS ES teardown; a next generation emergency call (NG-eCall) IMS session status; an IMS eCall establishment; an IMS eCall teardown; a single radio voice call continuity (SRVCC) status; a roaming status; an access event; and a non-IMS target destination IMS session status event.

In some other embodiments, the obtaining of the information related to the at least one of the IMS events and the IMS analytics data further includes subscribing to the one or more IMS nodes to be notified of information related to the at least one of the IMS events and the IMS analytics data requested by the second NF; and receiving the information related to the at least one of the IMS events and the IMS analytics data from the one or more of the corresponding IMS nodes.

In an embodiment, the first NF is a network function type that is the only NF consumer type for the at least one of the IMS events and IMS analytics data generated by the one or more of the corresponding IMS nodes.

In another embodiment, the registry function comprises a network repository function (NRF).

Having generally described arrangements for IMS support for NWDAF, a more detailed description of some of the embodiments are provided as follows with reference to FIGS. 7 and 8, and which may be implemented by WD 12, first NN 14 (e.g., NRF), second NN 16 (e.g., consumer NF such as NWDAF), third NN 18 (provider NF such as IMS IWF or IMS nodes), and/or one or more fourth NNs 80. For example NNs 80 may include NN**80*a* (e.g., P-CSCF1), NN80*b* (e.g., P-CSCF2), NN80*c* (e.g., P-CSCF3), NN80*d* (e.g., S-CSCF1), NN80*e* (e.g., S-CSCF2), NN80*f* (e.g., E-CSCF1), NN80*g* (e.g., E-CSCF2), NN80*h* (e.g., NEF), NN80*i*** (e.g., AS which may be a third-party AS).

Referring now primarily to FIGS. 7 and 8, FIG. 7 depicts an example architecture, e.g., for option 1. FIG. 8 depicts another example architecture, e.g., for option 2. In FIG. 7, third NN 18 (e.g., IMS IWF) may be configured to communicate (e.g., directly) with other nodes (e.g., one or more of NNs 80) for fetching all data relevant to subscription received. Third NN 18 may be aware of events supported by other nodes such as CSCF nodes through configuration. In FIG. 8, at least one of NNs **80*a*-80*g* (e.g., IMS nodes such as P-CSCF, S-CSCF, etc.) may be configured to register, at first NN 14 (e.g., NRF), the events they support. In some embodiments, these events are intended to be subscribed to by consumers of third NN 18 (e.g., the IMS IWF) and not any other consumer. In some other embodiments, e.g., a hybrid scenario, where some events are fetched (e.g., directly) from IMS nodes as per option 1, while other events are fetched through subscription to the first NN (e.g., NRF) from the IMS IWF consumer, and/or as a direct subscription by the third NN 18 (e.g., IMS IWF consumer node) to the IMS node (e.g., one of fourth NNs 80***a*-80*g*) itself.

The following is a nonlimiting list of one or more events that may be subscribed to or requested by NFs and/or AFs (i.e., second NN 16, third NN 18, or any other node) according to the techniques in the present disclosure. Each of the events may be associated with a corresponding event identifier (ID) which may be used by NFs and/or AFs to subscribe to the event. For example, an NF, such as, second NN 16 (e.g., NWDAF) may subscribe to or otherwise be provided IMS information by subscribing to one or more of the following events at the third NN 18 (e.g., IMS IWF) via the first NN 14 (e.g. NRF).

Note that, although some embodiments are described with reference to the third NN 18 (e.g., IMS IWF) as an IMS function that exposes its services to be discovered by the second NN 16 (e.g., NWDAF in 5G system), some embodiments may alternatively be implemented as one or more NWDAF instance(s) that are collocated with an IMS as an IMS-NWDAF providing reports to the central NWDAF in the 5G system in response to a subscription by the central NWDAF to those reports. In some embodiments, the IMS IWF and the NWDAF are comprised in the same network node such as network node 16 or network node 18.

List of Events:

WD information can be a globally unique subscription permanent identifier (SUPI) and/or an IMS public Identity. In case of SUPI, the corresponding default IMS Public Identity may be used as WD information. The WD information may be used to identify the WD or group of WDs 12 whose IMS information is requested/subscribed to.

- WD Reachability in IMS-Initial IMS Registration: This event reports when a specific WD 12 is IMS registered/de-registered, when any WD 12 in a group identified by a Group ID is registered/de-registered, and/or when any WD 12 is registered/de-registered.
  - S-CSCF (e.g., fourth NN 80*d*, 80*e*) supports/reports this event.
- IMS Session Status: IMS Voice session Establishment: This event reports when a specific WD established/received an IMS Voice session, when any WD is a group identified by a Group ID established/received an IMS session, and/or when any WD 12 established an IMS session.
  - S-CSCF (e.g., fourth NN 80*d*, 80*e*) supports/reports this event.
- IMS Session Status: IMS Voice session Teardown: This event reports when a specific WD released an IMS session, when any WD 12 is a group identified by a Group ID released an IMS session, or when any WD 12 released an IMS session.
  - S-CSCF (e.g., fourth NN 80*d*, 80*e*) supports/reports this event.
- ES IMS Session Status: IMS Emergency session (ES) Establishment: This event reports when a specific WD 12 established an IMS ES session, when any WD 12 is a group identified by a Group ID established an IMS ES session, or when any WD 12 established an IMS ES session.
  - E-CSCF (e.g., fourth NN 80*f*, 80*g*) supports/reports this event.
- NG-eCall IMS Session Status: IMS eCall (NG-eCall) Establishment: This event reports when a specific WD 12 established an NG-eCall session, when any WD is a group identified by a Group ID established an NG-eCall ES session, or when any WD established an NG-eCall session.
  - E-CSCF (e.g., fourth NN 80*f*, 80*g*) supports/reports this event.
- ES IMS Session Status: IMS ES Teardown: This event reports when a specific WD 12 released an IMS ES session, when any WD 12 is a group identified by a Group ID released an IMS ES session, or when any WD 12 released an IMS ES session.
  - E-CSCF (e.g., fourth NN 80*f*, 80*g*) supports/reports this event.
- NG-eCall Session Status: IMS eCall Teardown: This event reports when a specific WD released an NG-eCall session, when any WD is a group identified by a Group ID released an NG-eCall session, or when any WD released an NG-eCall session.
  - E-CSCF (e.g., fourth NN 80*f*, 80*g*) supports/reports this event.
- Single radio voice call continuity (SRVCC) Status: SRVCC occurrence: This event reports when a specific WD 12 has been subject to SRVCC, when any WD 12 is a group identified by a Group ID is subject to SRVCC, or when any WD 12 has been subject to SRVCC
  - P-CSCF (e.g., fourth NN 80*a*, 80*b*, 80*c*) supports/reports this event.
- Roaming Status: Inbound Roamer Initial IMS Registration: This event reports when a specific inbound roamer WD 12 is IMS registered/de-registered, when any inbound roamer WD 12 in a group identified by a Group ID is registered/de-registered, or when any inbound roamer WD 12 is registered/de-registered.
  - S-CSCF supports/reports this event.
- Access Event: This event reports when a specific IMS is established through EPS FB, NR, EPS, or WLAN.
  - P-CSCF/S-CSCF (e.g., fourth NN 80*a*, 80*b*, 80*c*) supports/reports this event.
- Non-IMS Target Destination IMS Session Status Events: This event reports when a targeted non-IMS subscriber received an IMS session.
  - S-CSCF (e.g., fourth NN 80*c*, 80*d*) supports/reports this event.

In some embodiments, an NF (e.g., NWDAF, or any other known NF in the 5GC) can subscribe to one or more of the events listed above, which may be produced/provided by the third NN 18 (e.g., IWF IMS) described herein. The second NN (e.g., consumer NF) may subscribe via NRF. The subscription may then be accepted by the event provider/producer NF (i.e., third NN 18 such as the IMS IWF), and the second NN 16 (e.g., consumer NF) may then be notified when such events occur.

Profile Registration

The following is an example of a profile that may be used by the IMS IWF to register itself to the NRF.

- Service Operation name: Nnrf_NFManagement_NFRegister.
- Inputs (may be required): NF type, FQDN or IP address of NF, Names of IWF services and name of supported IMS Events that can be collected on behalf of IMS nodes (if IMS nodes do not directly register their own profile to NRF).

Inputs, Optional.

Outputs (may be required): Result indication.

Outputs, Optional: None.

IMS Services

The following may include a description of one or more of the services that may be provided by the IWF/IMS-NWDAF.

Nims_EventExposure Service

Service description: This service provides IMS specific events on IMS subscribers towards consumer NF (i.e., second NN 16). The service operations exposed by this service allow other NFs to subscribe and get notified of IMS events on IMS subscribers. The following are the key functionalities of this NF service.

- Allow consumer NFs to Subscribe and unsubscribe for an Event ID on IMS Session(s);
- Allow consumer NFs to Subscribe and unsubscribe for an Event ID on IMS Registration Status;
- Allow consumer NFs to Subscribe and unsubscribe for an Event ID on IMS access networks;
- Allow consumer NFs to Subscribe and unsubscribe for an Event ID on roaming;
- Allow the NWDAF to collect data for network data analytics;
- Notifying events on the IMS specific events to the subscribed NFs; and
- Allow consumer NFs to acknowledge or respond to an event notification.
  - The following events can be subscribed by a NF consumer ( )
    - Input (may be required): NF ID, Target of Event Reporting: WD(s) ID (one or more identity including either SUPI or Internal Group Identifier or indication that any WD 12 is targeted, or Telephone number, or IMS Public Identity), ((set of) Event ID(s) as defined above, Notification Target Address (+Notification Correlation ID)) s, Event Reporting Information such as defined in Table 4.15.1-1 of 3GPP Technical Specification (TS) 23.502. See also list of events above.
    - Note that the third NN 18 (e.g., IWF) may convert a telephone number to Tel-URI.
    - Input, Optional: (Event Filter(s) associated with each Event ID; Event Filter(s) defined above, Subscription Correlation ID (in the case of modification of the event subscription), Expiry time.
    - Output (may be required): When the subscription is accepted: Subscription Correlation ID (required for management of this subscription), Expiry time (required if the subscription can be expired based on the operator's policy).
    - Output, Optional: First corresponding event report is included, if available.

Nims_EventExposure_Notify Service Operation

- Service operation name: Nims_EventExposure_Notify
- Service operation description: Provides the previously subscribed event information to the NF Consumer which has subscribed to that event before.
- Input (may be required): Event ID, Notification Correlation Information, WD ID(s) (SUPI and if available IMPU), time stamp.
- Input, Optional: Event specific parameter list as described above.
- Output (may be required): Result Indication.
- Output, Optional: None.

In some embodiments, when the third NN 18 (e.g., IWF) detects the WD event corresponding to a Subscription, it may invoke Nims_EventExposure_Notify service operation to the NF consumers which have subscribed to the WD event before. The event may be notified towards the NF consumers for which the Event filters match. The Notification Target Address (+Notification Correlation ID) indicates to the Event Receiving NF the specific event notification subscription. The event specific parameter may indicate the type of event and related information.

In some embodiments, the optional event specific parameter list provides the values that matched for generating the event notification. The parameter values to match are specified during the event subscription (see e.g., clause 5.2.2.3.2 in TS 23.502). For example, if the event type reported is "IMS Session Status", the event specific parameter list contains the value of the new IMS Session Status.

Nims_EventExposure_UnSubscribe Service Operation

- Service operation name: Nims_EventExposure_UnSubscribe.
- Description: This service operation is used by an NF to unsubscribe event notifications.
- Input (may be required): Subscription Correlation ID.
- Input, Optional: None.
- Output (may be required): None.
- Output, Optional: None As noted above, some embodiments may be implemented as one or more NWDAF instance(s) denoted as IMS NWDAF, such third NN 18 comprising second NN 16, providing reports to the central NWDAF in the 5G system in response to a subscription by the central NWDAF to those reports. For example, when a consumer NF (i.e., second NN 16) requests IMS-related analytics, to a central NWDAF, the central NWDAF can look up a first NN 14 (e.g., NRF) for an IMS-NWDAF that can handle a particular IMS analytics ID that is requested. The central NWDAF can then forward the consumer NF's IMS-related analytics request to that IWF/IMS-NWDAF. The latter collects data by e.g., non-standard way from IMS nodes, puts together an analytics report, and returns the report via the central NWDAF to the original requesting consumer NF.

In some embodiments, a registration of a profile may be transmitted from a producer node (e.g., a service producer). A request from a consumer node (e.g., a service consumer) may be a request to discover the producer node for certain events the consumer node is interested in and/or may use to perform one or more actions. The NRF (i.e., the first NN 14) may provide, for example, the IMS IWF (i.e., the third NN 18) as the producer node of those events (e.g., even if the IMS IWF collects the data/events from the IMS NFs). In one or more embodiments, the IMS IWF (i.e., third NN 18) may register its profile informing the NRF that it supports providing/collecting data related to IMS events on behalf of the IMS NFs (i.e., one or more of the fourth NNs 80). In an embodiment, each NF of the IMS provider may register its profile in NRF where the profile indicates the supported events. The profile may indicate a link/address/information as to which NF the NRF should provide to a consumer that is interested in receiving the data/events (e.g., IMS IWF).

In some other embodiments, once the consumer node has sent a request to the NRF (i.e., the first NN 14) for events it is interested in, the NRF returns to the consumer node an identification of the IMS IWF (i.e., third NN 18) for the events that are requested. In one or more embodiments, IMS events and IMS analytics data are supported by the provider NF and/or the IMS IWF on behalf of the NFs in IMS.

In an embodiment, in a federated NWDAF, the IMS IWF can include an NWDAF function that collects events/analytics data from the IMS NFs.

In another embodiment, when an IMS NWDAF is used, it behaves as the IMS IWF collecting the data.

In some embodiments, the IMS nodes are producers of the IMS events and/or IMS analytics data. The IMS IWF may behave as a producer for collecting the IMS events and/or IMS analytics data on behalf of the IMS nodes.

In some other embodiments, the IMS IWF (and/or IMS NWDAF in a federated NWDAF) may receive the subscription request for one or more IMS events that the IMS IWF/IMS NWDAF collects and/or had already collected from the IMS nodes.

In an embodiment, the subscription request is not sent to the NRF but is sent to the IMS IWF (or IMS NWDAF in another embodiment), which may occur after the NF consumer has discovered with the NRF, which IMS IWF or IMS NWDAF to contact to collect the events/data.

The following is a nonlimiting list of other example embodiments:

Embodiment E1. A network function implemented in a network node configured to, and/or comprising a communication interface and/or comprising processing circuitry configured to:

- transmit a registration to a registry function to register an associated service profile, indicating the network node capability to expose Internet Protocol (IP) Multimedia Subsystem (IMS) events/analytics data on behalf of IMS nodes of an IMS network;
- receive, from a second network function (NF), a request to subscribe to and be notified of one or more of the IMS events/analytics data;
- obtain information related to the IMS events/analytics data from the corresponding IMS nodes in the IMS network; and
- notify the second network function of the IMS event/analytics data based on the received subscription.

Embodiment E2. The network function of Embodiment E1, wherein the associated service profile includes a list of the IMS events available at the network node to be registered by the network node on behalf of the IMS nodes of the IMS network.

Embodiment E3. The network function of Embodiment E1, wherein the network node is an IMS network node or an IMS IWF network node, the second NF is a service consumer NF.

Embodiment E4. The network function of Embodiment E1, wherein the service consumer NF is a network analytics function (NWDAF).

Embodiment E5. The network function of Embodiment E1, wherein the service consumer NF is a central network analytics function (NWDAF), and the network node is an IMS NWDAF collecting events/analytics data from the IMS node in the IMS network.

Embodiment E6. The network function of Embodiment E5, wherein the IMS NWDAF collects events/analytics data from one or more of the IMS nodes in the IMS network and transmits a report to the central NWDAF based on the received subscription from the central NWDAF.

Embodiment E7. The network function of any one of Embodiments E1-E3, wherein the request comprises at least one of: an NF ID identifying the IMS node or IMS IWF node, a WD ID associated with the IMS event, an event ID and a correlation ID and the response indicates one of acceptance and non-acceptance of the requested subscription.

Embodiment E8. The network function of any one of Embodiments E1-E4, wherein the network node and/or the communication interface and/or the processing circuitry is further configured to:

- detect an occurrence of the IMS event; and
- as a result of the subscription and the detection of the IMS event, send a notification about the detection of the IMS event to the second NF.

Embodiment E9. The network function of any one of Embodiments E1-E5, wherein the IMS event comprises at least one of: an IMS session, IMS registration status, IMS access network and roaming.

Embodiment E10. The network function of any one of Embodiment E4-E6, wherein the network node and/or the communication interface and/or the processing circuitry is configured to:

- receive a request comprising the correlation ID to unsubscribe to the IMS event and unsubscribe the second NF to the IMS event as a result of the request to unsubscribe.

Embodiment E11. The network function of Embodiment E2, wherein the list of the IMS events comprises one or more of: WD reachability in IMS, IMS session status, IMS voice session establishment, IMS voice session teardown, ES IMS session status, IMS ES establishment, IMS ES teardown, NG-eCall IMS session status, IMS eCall establishment, IMS eCall teardown, SRVCC status, roaming status, access event and non-IMS target destination IMS session status event.

Embodiment E12. The network function of Embodiment E1, wherein the network node and/or the communication interface and/or the processing circuitry is further configured to obtain the information related to the IMS events/analytics data by being configured to:

- subscribe to one or more second associated profiles, of one or more of the corresponding IMS nodes, the one or more second associated profiles of the one or more corresponding IMS nodes being registered directly with the registry function; and receive the information related to the IMS events/analytics data from the one or more corresponding IMS nodes, as a result of the subscription to the one or more of second associated profiles.

Embodiment E13. The network function of Embodiment E12, wherein the network function is of a network function type that is the only NF consumer type for the IMS events generated by the one or more of the corresponding IMS nodes; and the NF consumer type is an IMS IWF/IMS-NWDAF consumer type.

Embodiment E14. The network function of Embodiment E1, wherein the registry function comprises a network repository function (NRF).

Embodiment E15. A method implementing any one or more of the network function Embodiments E1-E14.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. A first network function, NF, implemented in a network node comprising a communication interface and processing circuitry in communication with the communication interface:

the communication interface being configured to:

transmit a registration to a registry function to register an associated service profile, the associated service profile indicating a capability of the first network function to expose, by the first network function, at least one of Internet Protocol, IP, Multimedia Subsystem, IMS, events and IMS analytics data of one or more IMS nodes of an IMS network;

receive, from a second NF, a request to subscribe to and be notified of the at least one of the IMS events and the IMS analytics data;

notify the second NF of the at least one of the IMS events and the IMS analytics data based at least in part on the received request to subscribe; and the processing circuitry being configured to:

obtain information related to the at least one of the IMS events and the IMS analytics data from the corresponding IMS nodes in the IMS network;

wherein the associated service profile includes a list of the at least one of the IMS events and the IMS analytics data available at the network node;

wherein the first NF is an IMS Network Data Analytics Function (NWDAF) acting as an IMS Interworking Function (IWF) and is a network function type that is the only NF consumer type for the at least one of the IMS events and IMS analytics data generated by the one or more of the corresponding IMS nodes.

2. The first NF of claim 1, wherein the network node is an IMS IWF network node, and the second NF is a service consumer NF.

3. The first NF of claim 2, wherein the service consumer NF is a network analytics function, NWDAF.

4. The first NF of claim 2, wherein the service consumer NF is a central NWDAF, and the network node comprises an IMS NWDAF collecting the at least one of the IMS events and the IMS analytics data from the IMS node in the IMS network.

5. The first NF of claim 4, wherein the IMS NWDAF collects the at least one of the IMS events and the IMS analytics data from one or more of the IMS nodes in the IMS network and transmits a report to the central NWDAF based on the received request to subscribe from the central NWDAF.

6. The first NF of claim 1, wherein:

the request comprises at least one of:

an NF identifier, ID, identifying at least one IMS node where the at least one of the IMS events and the IMS analytics data can be collected;

a wireless device ID associated with one IMS event;
an IMS event ID;
a correlation ID; and
wherein a response to the request indicates one of an acceptance and a non-acceptance of the request to subscribe.

7. The first NF of claim 1, wherein:
the processing circuitry is further configured to:
detect an occurrence of one IMS event; and
the communication interface is further configured to:
as a result of the request to subscribe to the at least one of the IMS events and the IMS analytics data and the detection of the at least one of the IMS events and the IMS analytics data, transmit a notification about the detection of the at least one of the IMS events and the IMS analytics data to the second NF.

8. The first NF of claim 1, wherein the communication interface is further configured to:
receive another request comprising one correlation ID to unsubscribe from the at least one the IMS events and the IMS analytic data; and
unsubscribe the second NF from the at least one the IMS events and the IMS analytic data, as a result of the other request to unsubscribe.

9. The first NF of claim 1, wherein the at least one of the IMS events and the IMS analytics data comprises one or more of:
a wireless device reachability in IMS;
an IMS session status;
an IMS registration status;
an IMS access network status;
an IMS voice session establishment;
an IMS voice session teardown;
an emergency session, ES, IMS session status;
an IMS ES establishment;
an IMS ES teardown;
a next generation emergency call, NG-eCall, IMS session status;
an IMS eCall establishment;
an IMS eCall teardown;
a single radio voice call continuity, SRVCC, status;
a roaming status;
an access event; and
a non-IMS target destination IMS session status event.

10. The first NF of claim 1, wherein the processing circuitry is further configured to obtain the information related to the at least one of the IMS events and the IMS analytics data by being configured to:
subscribe to the one or more IMS nodes to be notified of information related to the at least one of the IMS events and the IMS analytics data requested by the second NF; and
cause the communication interface to receive the information related to the at least one of the IMS events and the IMS analytics data from the one or more of the corresponding IMS nodes.

11. The first NF of claim 1, wherein the registry function comprises a network repository function, NRF.

12. A method of a first network function, NF, implemented in a network node, the method comprising:
transmitting a registration to a registry function to register an associated service profile, the associated service profile indicating a capability of the first network function to expose, by the first network function, at least one of Internet Protocol, IP, Multimedia Subsystem, IMS, events and IMS analytics data of one or more IMS nodes of an IMS network;
receiving, from a second NF, a request to subscribe to and be notified of the at least one of the IMS events and the IMS analytics data;
obtaining, by the first network function, information related to the at least one of the IMS events and the IMS analytics data from the corresponding IMS nodes in the IMS network; and
notifying the second NF of the at least one of the IMS events and the IMS analytics data based at least in part on the received request to subscribe;
wherein the associated service profile includes a list of the at least one of the IMS events and the IMS analytics data available at the network node;
wherein the first NF is an IMS Network Data Analytics Function (NWDAF) acting as an IMS Interworking Function (IWF) and is a network function type that is the only NF consumer type for the at least one of the IMS events and IMS analytics data generated by the one or more of the corresponding IMS nodes.

13. The method of claim 12, wherein the network node is an IMS IWF network node, and the second NF is a service consumer NF.

14. The method of claim 13, wherein the service consumer NF is a network analytics function, NWDAF.

15. The method claim 13, wherein the service consumer NF is a central NWDAF, and the network node comprises an IMS NWDAF collecting the at least one of the IMS events and the IMS analytics data from the IMS node in the IMS network.

16. The method of claim 15, wherein the IMS NWDAF collects the at least one of the IMS events and the IMS analytics data from one or more of the IMS nodes in the IMS network and transmits a report to the central NWDAF based on the received request to subscribe from the central NWDAF.

17. The method of claim 12, wherein:
the request comprises at least one of:
an NF identifier, ID, identifying at least one IMS node where the at least one of the IMS events and the IMS analytics data can be collected;
a wireless device ID associated with one IMS event;
an IMS event ID; and
a correlation ID; and
wherein a response to the request indicates one of an acceptance and a non-acceptance of the request to subscribe.

18. The method of claim 12, wherein the method further includes:
detecting an occurrence of one IMS event; and
as a result of the request to subscribe to the at least one of the IMS events and the IMS analytics data and the detection of the at least one of the IMS events and the IMS analytics data,
transmitting a notification about the detection of the at least one of the IMS events and the IMS analytics data to the second NF.

19. The method of claim 12, wherein the method further includes:
receiving another request comprising one correlation ID to unsubscribe from the at least one the IMS events and the IMS analytic data; and
unsubscribing the second NF from the at least one the IMS events and the IMS analytic data, as a result of the other request to unsubscribe.

20. The method of claim 12, wherein the at least one of the IMS events and the IMS analytics data comprises one or more of:

a wireless device reachability in IMS;

an IMS session status;

an IMS registration status;

an IMS access network status;

an IMS voice session establishment;

an IMS voice session teardown;

an emergency session, ES, IMS session status;

an IMS ES establishment;

an IMS ES teardown;

a next generation emergency call, NG-eCall, IMS session status;

an IMS eCall establishment;

an IMS eCall teardown;

a single radio voice call continuity, SRVCC, status;

a roaming status;

an access event; and a non-IMS target destination IMS session status event.

21. The method of claim 12, wherein the obtaining of the information related to the at least one of the IMS events and the IMS analytics data further includes:

subscribing to the one or more IMS nodes to be notified of information related to the at least one of the IMS events and the IMS analytics data requested by the second NF; and receiving the information related to the at least one of the IMS events and the IMS analytics data from the one or more of the corresponding IMS nodes.

22. The method of claim 12, wherein the first NF is a network function type that is the only NF consumer type for the at least one of the IMS events and IMS analytics data generated by the one or more of the corresponding IMS nodes.

23. The method of claim 12, wherein the registry function comprises a network repository function, NRF.

* * * * *